(12) United States Patent
Yang et al.

(10) Patent No.: US 8,936,864 B2
(45) Date of Patent: *Jan. 20, 2015

(54) BATTERIES WITH PHASE CHANGE MATERIALS

(75) Inventors: Jihui Yang, Lakeshore (CA); Steven Cai, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 208 days.

This patent is subject to a terminal disclaimer.

(21) Appl. No.: 13/175,483

(22) Filed: Jul. 1, 2011

(65) Prior Publication Data

US 2012/0171523 A1 Jul. 5, 2012

Related U.S. Application Data

(60) Provisional application No. 61/362,058, filed on Jul. 7, 2010.

(51) Int. Cl.
| | | |
|---|---|---|
| *H01M 10/50* | (2006.01) | |
| *H01M 10/613* | (2014.01) | |
| *H01M 10/615* | (2014.01) | |
| *H01M 10/625* | (2014.01) | |
| *H01M 10/647* | (2014.01) | |
| *H01M 10/653* | (2014.01) | |
| *H01M 10/6567* | (2014.01) | |

(52) U.S. Cl.
CPC ...... *H01M 10/5004* (2013.01); *H01M 10/5006* (2013.01); *H01M 10/5016* (2013.01); *H01M 10/5032* (2013.01); *H01M 10/504* (2013.01); *H01M 10/5075* (2013.01)
USPC .......................................................... 429/120

(58) Field of Classification Search
CPC ..................... H01M 10/5004; H01M 10/5006; H01M 10/5016; H01M 10/5032; H01M 10/504; H01M 10/5075
USPC .......................................................... 429/120
See application file for complete search history.

(56) References Cited

U.S. PATENT DOCUMENTS

| | | | | |
|---|---|---|---|---|
| 4,797,160 | A | | 1/1989 | Salyer |
| 5,804,297 | A | * | 9/1998 | Colvin et al. ................. 428/327 |
| 5,952,815 | A | * | 9/1999 | Rouillard et al. ............. 320/116 |
| 2002/0064692 | A1 | | 5/2002 | Johnson |
| 2006/0063066 | A1 | | 3/2006 | Choi et al. |
| 2006/0231233 | A1 | | 10/2006 | Farid et al. |
| 2008/0078542 | A1 | | 4/2008 | Gering et al. |
| 2008/0090137 | A1 | | 4/2008 | Buck et al. |
| 2011/0045333 | A1 | * | 2/2011 | Kim et al. ..................... 429/120 |

OTHER PUBLICATIONS

U.S. Non-Final Office Action dated Feb. 6, 2013 pertaining to U.S. Appl. No. 13/175,191, filed Jul. 1, 2011.
Non-Final Office Action dated Feb. 15, 2013 pertaining to Utility U.S. Appl. No. 13/175,225, filed Jul. 1, 2011.
Kenisarin, et al., Solar Energy Storage Using Phase Change Materials, Renewable & Sustainable Energy Reviews 11 (2007), pp. 1913-1965, Durham, UK.

(Continued)

*Primary Examiner* — Nicholas P D'Aniello
(74) *Attorney, Agent, or Firm* — Dinsmore & Shohl LLP

(57) ABSTRACT

A battery pack with phase change materials (PCM). The PCM would improve the heating and cooling capabilities under various vehicle operating conditions. Methods of controlling the temperature in battery packs are also described.

7 Claims, 1 Drawing Sheet

(56) References Cited

OTHER PUBLICATIONS

U.S. Final Office Action dated Apr. 29, 2013 pertaining to U.S. Appl. No. 13/175,191, filed Jul. 1, 2011.

U.S. Final Office Action dated May 16, 2013 pertaining to U.S. Appl. No. 13/175,225, filed Jul. 1, 2011.

Non-Final Office Action dated Sep. 11, 2013 pertaining to U.S. Appl. No. 13/175,191, filed Jul. 1, 2011.

* cited by examiner

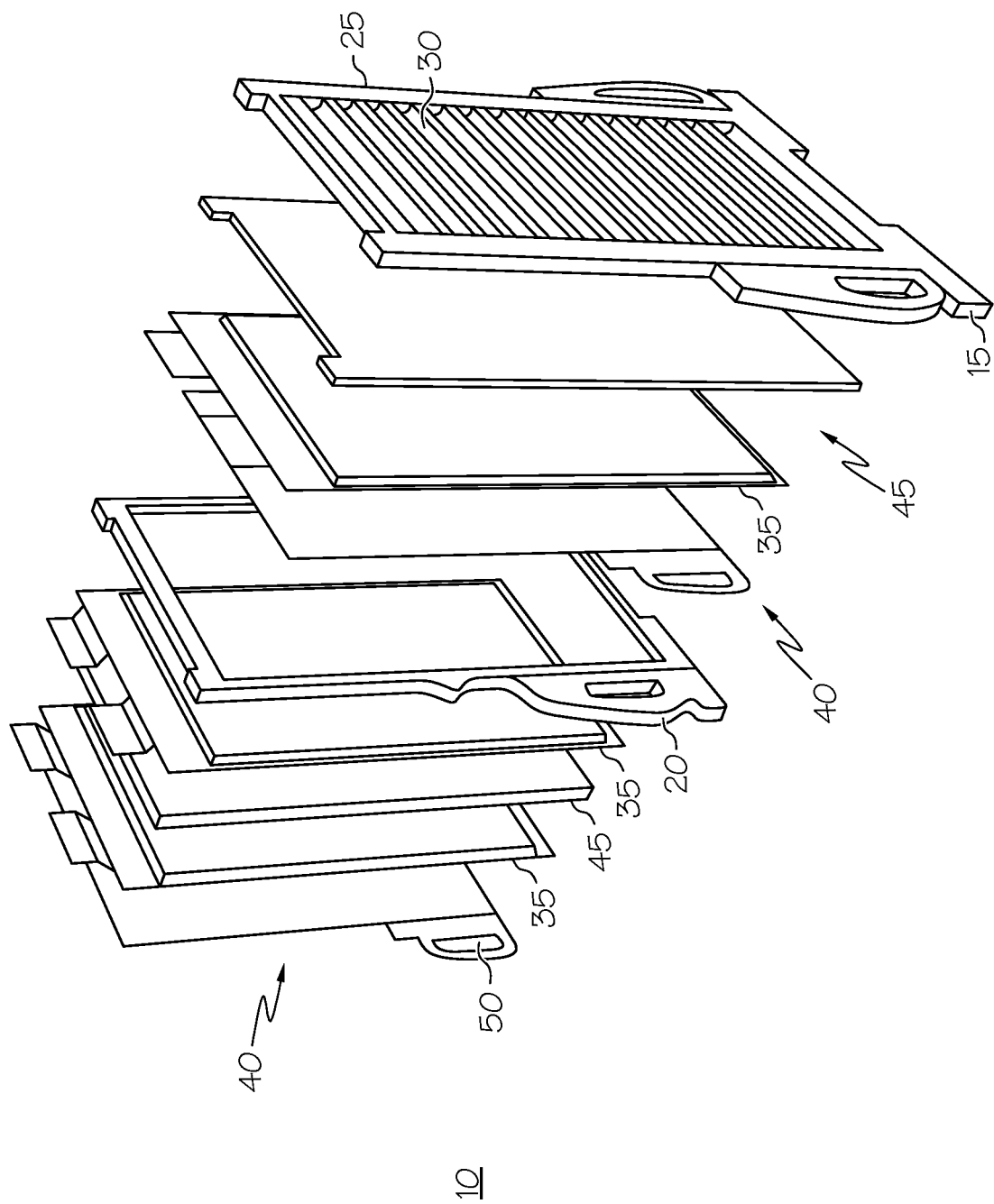

BATTERIES WITH PHASE CHANGE MATERIALS

CROSS-REFERENCE TO RELATED APPLICATIONS

This application claims the benefit of U.S. Provisional Application Ser. No. 61/362,058, filed on Jul. 7, 2010.

This invention relates generally to battery packs and more particularly to battery packs using phase change materials, and to methods of controlling the temperature in a battery pack using a phase change material.

Most passenger vehicles are parked about 90% of the time. In general, both energy (discharge capacity) and power (operating voltage) of Li-ion batteries are substantially reduced as the temperature falls below about −10 C. At higher temperature (greater than about 45 C), battery life is substantially degraded. Current liquid-based vehicular Li-ion battery cooling systems lack the capability of rapid heat dissipation during battery thermal runaway.

BRIEF DESCRIPTION OF THE DRAWING

The FIGURE shows one embodiment of a portion of a battery pack.

DETAILED DESCRIPTION

A battery, for example a lithium ion battery, with phase change materials (PCM) would improve the heating and cooling capabilities under various vehicle operating conditions. The PCM could help to minimize unnecessary operating temperature swings, increase heating and cooling uniformity, and reduce heating and cooling requirements.

Batteries utilizing PCM can control the temperature excursions and maintain temperature uniformity without, or with reduced use of, active cooling components such as fans, blowers, or pumps found in air/liquid-cooling systems. As a result, a compact, light-weight, and energy efficient system can be achieved, and the energy usage with battery life and performance throughout the operating range of the hybrid electric vehicle (HEV)/plug-in electric vehicle (PEV) can be optimized.

The thermal properties of various PCM and methods of heat transfer enhancement are described in Kenisarin and Mahkamov, "Solar energy storage using phase change materials," Renewable and Sustainable Energy Reviews 11 (2007) 1913-1965, which is incorporated herein by reference. Tables 1-3 show properties of some commercially available PCM.

The FIGURE shows one embodiment of a portion of a battery pack 10. The battery pack 10 has an end frame 15 and repeating frame 20. The end frame 15 can have an edge portion 25 surrounding a cooling plate 30. The cooling plate 30 for the end frame can have ribs for added stability, if desired. There are battery cells 35, cooling fins 40, and compressible isolator sheets 45. The battery pack 10 will typically include one or more battery cells 35, one or more compressible isolator sheets 45, one or more cooling fins 40, and one or more repeating frames 15. The compressible isolator sheets 45 and cooling fins 40 are next to the battery cells 35. The compressible isolator sheets 45 and cooling fins 40 are desirably on opposite sides of the battery cell 35, although this is not required. The compressible isolator sheets 45 are typically in contact with the battery cell 35, but they do not have to be. For example, if a very large amount of cooling is needed, there could be a cooling fin 40 on both sides of the battery cell 35, and the compressible isolator sheet 45 could be in contact with the cooling fins 40. Various arrangements of battery pack 10 components could be used, as is known to those of skill in the art.

The compressible isolator sheet 45 absorbs the cell expansion during cycling so that the cell can maintain a desired cell compression. The material should have long-term compressive strength and thermal performance. Suitable materials include, but are not limited to, compressible foam materials. Suitable compressible foam materials include, but are not limited to, polystyrene foam. One example of a suitable foam is Styrofoam™ brand Highload™ 100 insulation (e.g., Type V), which has a minimum compressive strength of 100 psi (690 kPa) available from The Dow Chemical Co.

There is at least one phase change material (PCM), and desirably, at least two different PCM, in the compressible isolator sheet 45 of the battery pack to form a thermal composite. The PCM are materials that change phase at certain temperatures and are capable of storing and releasing large amounts of energy. Heat is absorbed or released when the materials change phase, from solid to liquid, or liquid to solid, for example. For example, one PCM could change its phase at a low temperature limit, such as about freezing or below (e.g., less than about 0 C, or less than about −5 C, or less than about −10 C, or about −10 C, or in a range of about 0 C to about −10 C), and another at a high temperature limit (e.g., above about 40 C, or above about 45 C). Thermal insulation of battery cells using PCM can maintain battery cell temperature for longer periods of time under extreme temperature conditions. Additional PCM with different phase change temperatures could also be included, if desired.

Desirably, the PCMs have phase change temperatures near the desired temperatures and large heat capacity values. Although these are suggested temperatures (ranges), other temperatures (ranges) could be selected, if desired, as is known to those of skill in the art. A large number of PCMs are available in any desired temperature range from about −10 C to about 190 C.

The use of PCM will provide the ability to maintain the cell temperature in a desired temperature range without drawing power from the battery or another energy source. It will also improve cell cycle/calendar life under extreme parking conditions.

PCMs in close contact with the battery cells can result in one or more of: reduced power fade, reduced capacity fade, improved battery life and durability, reduced warranty costs, improved vehicle range, and preventing or reducing thermal runaway.

The end frames 15 and the repeating frames 20 for the battery pack 10 are typically made of a light-weight, non-conductive material. Suitable materials include, but are not limited to, plastics, such as polypropylene, nylon 6-6, and other low cost materials. The frames 15 can be fiber-reinforced for structural strength, if desired.

The cooling fins 40 can be single plates or multilayer structures, depending on the cooling needs of the particular application. The cooling fins 40 can be made of any conventional cooling material. Suitable materials include, but are not limited to, light-weight thermal conductors such as aluminum, alumina, copper, aluminum silicon carbide, beryllium oxide, and the like, or sandwich structures of two light-weight thermal conductors separated by a layer of compressible foam or other expansion compensator to allow for expansion and contraction of the battery cells 35 on either side of the cooling fin 40 caused by the charge state, heating, and cooling of the cells. It can incorporate integrated heat pipe technology, if desired. There can be a film for electrical isolation on the cooling fin 40, if desired. In addition, there could be a foam sheet with PCM on the cooling fins 40. The PCM in the foam sheet on the cooling fin 40 would likely have the same phase change temperature as the PCM in the compressible isolator sheet 45, although this is not necessary.

The cooling fins 40 can be air or liquid cooled/heated. For air cooling/heating, the cooling fin can be as simple as a flat metal sheet. For liquid cooling/heating, the fins have coolant channels in between two welded metal plates as well as coolant inlets and coolant outlets. The coolant inlets and outlets can be individually connected to a manifold for coolant circulation, or they can extend from the fins in ear-shaped features 50, as described in U.S. patent application Ser. No. 12/774,873, filed May 6, 2010, entitled Easy-To-Assemble Battery Pack With Prismatic Battery Cells; and U.S. patent application Ser. No. 12/853,620, filed Aug. 10, 2010, entitled Integrated Cooling Fin And Frame which are incorporated herein by reference. To fill up the gap between the cooling fins 40 and to provide proper coolant sealing, the ear-like extensions 50 can be molded with plastic that is sealable or having rubber seals around the openings for coolant. The coolant can thus be easily fed into and removed from end plates of the stack. Fluid manifolds are attached to the fluid inlets and outlets to distribute the cooling fluid through the cooling channels. The manifolds can be brazed onto the fluid inlets and outlets, if desired. Alternatively, the manifolds can be connected using removable connection, such as with seals. The use of removable connections improves serviceability.

PCM can be included in the liquid coolant with a phase change temperature at a higher temperature (e.g., greater than about 100 C, or greater than about 150 C, or about 100 C to about 200 C, or about 150 C to about 200 C). The liquid coolant with PCM additives which melt and solidify at certain temperatures which are capable of storing and releasing large amounts of energy can prevent catastrophic battery failure.

In another embodiment, because of higher stiffness, the cooling fins 40 can be the primary structural and locating members of the stack to hold battery cells (rather than using the repeating frames), as described in U.S. patent application Ser. No. 12/774,873. In this arrangement, after compression, the stack can be contained in removable restraints, including, but not limited to, clamping with bolts or tie rods, wrapping with metal straps, or boxing in a hard case, for the final assembly, which saves the weight and cost of repeating frames, as well as assembly time. In remanufacturing, the stack can be easily disassembled because of the weld-free assembly, and any bad cells or other components can be replaced with minimal time and cost.

Additionally, PCM could be included for various power electronics components for the battery pack 10, including, but not limited to, the battery disconnect unit (BDU), the battery management system (BMS), and the like. Currently, those components are not cooled in liquid cooled battery packs. However, they are located very close to the battery cell modules, which could heat up nearby cells. As a result, it could create non-uniform degradation of the cells and cause an imbalance between them. A pad containing PCM could be placed under the BDU or BMS control hardware.

One important advantage of the present invention is the ability to cool a battery pack when a vehicle containing the battery pack 10 is parked at high temperature for an extended period (e.g., in an uncovered, long term parking facility in Arizona in the summer). Another advantage is reducing or eliminating of the need for a liquid or air cooling system inside the battery pack. Elimination of the cooling system would allow the removal of components such as the coolant reservoir, coolant pump, and coolant hoses for a liquid cooled system, or fans and air ducts for an air cooled system.

Commercially Produced PCMs

TABLE 1

Thermo-physical properties of some phase change heat storage products from EPS Ltd

| Trade mark | Melting point (C.) | Heat of fusion (kJ/kg) | Sensible heat solid/liquid (kJ/kg ° C.) | Heat conductivity (WmK) | Density solid/liquid (kg/l) | Volume expansion[4] (%) | Heat storage capacity (kJ/ball) (diameter 100 mm) | Heat storage capacity (kWh/m³) |
|---|---|---|---|---|---|---|---|---|
| E21 | 21 | 150 | 0.68 | 0.43 | 1.48 | 8-9 | 116 | 32.4 |
| E23 | 23 | 155 | 0.69 | 0.43 | 1.475 | 8-9 | 119 | 33.3 |
| E28 | 28 | 193 | 2.22 | 0.21 | 0.769 | 8-9 | 101 | 28.2 |
| E30 | 30 | 201 | 0.69 | 0.48 | 1.304 | 8-9 | 137 | 38.3 |
| E32 | 32 | 186 | 0.78 | 0.51 | 1.460 | 8-9 | 142 | 39.8 |
| A32 | 32 | 145 | 2.20 | 0.21 | 0.845 | 9-10 | 95 | 26.6 |
| E44 | 44 | 105 | 1.61 | 0.43 | 1.584 | 8-9 | 87 | 24.3 |
| E48 | 48 | 201 | 0.70 | 0.45 | 1.670 | 8-9 | 176 | 49.1 |
| E50 | 50 | 104 | 1.59 | 0.43 | 1.601 | 8-9 | 87 | 24.4 |
| E58 | 58 | 167 | 2.55 | 0.69 | 1.505 | 8-9 | 151 | 36.7 |
| E71 | 71 | 123 | 1.86 | 0.51 | 1.690 | 8-9 | 109 | 30.4 |
| E72 | 72 | 140 | 2.13 | 0.58 | 1.666 | 8-9 | 122 | 34.0 |
| E83 | 83 | 152 | 2.31 | 0.62 | 1.600 | 8-9 | 127 | 35.5 |
| E89 | 89 | 163 | 2.48 | 0.67 | 1.550 | 8-9 | 132 | 37.0 |
| E117 | 117 | 169 | 2.61 | 0.70 | 1.450 | 8-9 | 128 | 35.8 |
| A164 | 164 | 306 | | | 1.500 | 9-10 | 240 | 67.1 |

TABLE 2

Thermo-physical properties of some phase change heat storage products from TEAP Energy

| Trade mark | Melting point (° C.) | Heat of fusion (WH/l) | Sensible heat solid/liquid (Wh/L° C.) | Heat conductivity solid/liquid[a] (W/mK) | Density solid/liquid (kg/l) | Volume expansion[b] (%) | Heat storage capacity (kJ/ball) (diameter 75 mm) | Heat storage capacity (kW h/m³) | Price of bulk product with shipping 100 kg (AUD/kg) | Price of encapsulated product with shiping 1000 balls (AUD/ball) |
|---|---|---|---|---|---|---|---|---|---|---|
| TH 24 | 24 | 70.2 | 2.7/2.2 | 0.8 | 1.6/1.5 | 8 | ≈45.5 | ≈32.2 | 10.90 + freight | |
| TH 29 | 29 | 79.0 | 0.67/0.99 | 1.09 (23° C.)/ 0.54 (38.7° C.) | 1.71 (25° C.)/ 1.56 (32° C.) | 8-9 | ≈51.2 | ≈36.2 | 9.10 + freight | 5.95 + freight |
| TH 58 | 58 | 80.7 | 1.12/1.63 | | 1.45/1.28 | 9-10 | ≈52.3 | ≈37.0 | 10.95 + freight | 6.45 + freight |
| H 89 | 89 | 63.6 | 0.84/1.29 | 0.69 (110° C.)/ 0.60 (140° C.) | 1.64 (25° C.) | 8-9 | ≈41.2 | ≈29.2 | 10.00 + freight | |

[a]Data from Zalba et al. [14].
[b]Our evaluation.

TABLE 3

Thermo-physical properties of some commercially available Rubitherm paraffins

| Trade mark | Melting point (° C.) | Heat of fusion[a] (kJ/kg) | Sensible heat solid/liquid (kJ/kg ° C.) | Heat conductivity (W/mK) | Density solid/liquid (kg/l) | Volume expansion (%) | Recommended operating temperature range (° C.) | Heat storage capacity in the recommended temperature range (KJ/kg) | Price of PCM[b] (€/mton) |
|---|---|---|---|---|---|---|---|---|---|
| RT 6 | ≈8 | ≈140 | 1.8/2.4 | 0.2 | 0.86 (−15° C.)/0.77 (15° C.) | 10 | (−3)-+12 | 174 | 2900-3500 |
| RT 27 | ≈28 | ≈146 | 1.8/2.4 | 0.2 | 0.87 (15° C.)/0.75 (70° C.) | 10 | 19-35 | 179 | 2900-3500 |
| RT 41 | ≈45 | ≈125 | 1.8/2.4 | 0.2 | 0.88 (15° C.)/0.76 (70° C.) | 10 | 35-50 | 155 | 2900-3500 |
| RT 42 | ≈43 | ≈150 | 1.8/2.4 | 0.2 | 0.88 (15° C.)/0.76 (70° C.) | 10 | 36-51 | 174 | 2900-3500 |
| RT 52 | ≈52 | ≈138 | 1.8/2.4 | 0.2 | 0.90 (15° C.)/0.76 (70° C.) | 10 | 40-55 | 167 | 2900-3500 |
| RT 54 | ≈55 | ≈148 | 1.8/2.4 | 0.2 | 0.90 (15° C.)/0.77 (70° C.) | 10 | 46-61 | 179 | 2900-3500 |
| RT 58 | ≈59 | ≈154 | 1.8/2.4 | 0.2 | 0.90 (15° C.)/0.76 (70° C.) | 10 | 48-62 | 181 | 2900-3500 |
| RT 65 | ≈64 | ≈154 | 1.8/2.4 | 0.2 | 0.91 (15° C.)/0.79 (70° C.) | 10 | 56-71 | 173 | 2900-3500 |
| RT 80 | ≈81 | ≈140 | 1.8/2.4 | 0.2 | 0.92 (15° C.)/0.77 (100° C.) | 10 | 71-86 | 175 | 2900-3500 |
| RT 90 | ≈90 | ≈163 | 1.8/2.4 | 0.2 | 0.93 (15° C.)/0.77 (100° C.) | 10 | 82-97 | 194 | 2900-3500 |
| RT 100 | ≈99 | ≈137 | 1.8/2.4 | 0.2 | 0.94 (15° C.)/0.77 (130° C.) | 10 | 91-106 | 168 | 2900-3500 |
| PK 80 A6 | ≈81 | ≈119 | 2.0 | 0.2 | 0.90 (20° C.) | 8 | 71-86 | 149 | 6000 |

[a]Our calculations using presented data.
[b]All prices are ex works Hamburg/Germany.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A battery pack comprising:
  a plurality of battery cells; and
  a battery cell cooling system comprising:
    at least one cooling plate defining at least one coolant fluid channel therein;
    a plurality of cooling fins, wherein each of the plurality of cooling fins comprise:
      a layer of foam containing a phase change material, and
      a cooling inlet and a cooling outlet, the cooling inlet and the cooling outlet configured to convey a cooling fluid to and from the at least one coolant fluid channel in the at least one cooling plate; and
    a plurality of substantially planar compressible isolator sheets each comprising at least two phase change materials to form a multi-temperature phase change material capability within the respective compressible isolator sheet, wherein at least one of the plurality of cooling fins and at least one of the plurality of compressible isolator sheets are placed next to and on opposite sides of at least one of the plurality of battery cells in a stacked relationship therebetween to accommodate expansion and contraction of the plurality of battery cells and to define a planar profile along a stacking dimension thereof to maximize contact surface area and thermal communication therebetween.

2. The battery pack of claim 1 wherein the first phase change material has a phase change from liquid to solid at a temperature of less than about 0° C. and the second phase change material has a phase change from solid to liquid at a temperature of greater than about 40° C.

3. The battery pack of claim 1 wherein the plurality of cooling fins are cooled by the coolant fluid via the cooling inlet and the cooling outlet and wherein the coolant fluid contains an additional phase change material.

4. The battery pack of claim 3 wherein the additional phase change material has a phase change from solid to liquid at a temperature of greater than about 100° C.

5. The battery pack of claim 1 wherein the plurality of compressible isolator sheets are made of a compressible foam.

6. The battery pack of claim 1 further comprising a battery disconnect unit or a battery management system or both and a pad containing a phase change material in contact with the battery disconnect unit or the battery management system or both.

7. A battery pack comprising:
a plurality of battery cells;
a battery cell cooling system comprising:
   at least one cooling plate defining at least one coolant fluid channel therein;
   a plurality of cooling fins, wherein each of the plurality of cooling fins comprise:
      a layer of foam containing a phase change material, and
      a cooling inlet and a cooling outlet, the cooling inlet and the cooling outlet configured to convey a cooling fluid to and from the at least one coolant fluid channel in the at least one cooling plate; and
   a plurality of substantially planar compressible isolator sheets each comprising at least two phase change materials to form a multi-temperature phase change material capability within the respective compressible isolator sheet, wherein at least one of the plurality of cooling fins and at least one of the plurality of compressible isolator sheets are placed next to and on opposite sides of at least one of the plurality of battery cells in a stacked relationship therebetween to accommodate expansion and contraction of the plurality of battery cells and to define a planar profile along a stacking dimension thereof to maximize contact surface area and thermal communication therebetween;
a battery disconnect unit or a battery management system or both; and
a pad containing a phase change material in contact with the battery disconnect unit or the battery management system or both.

\* \* \* \* \*